United States Patent Office 2,777,001
Patented Jan. 8, 1957

2,777,001

PREPARATION OF ALKOXY-BENZYLHALIDES

John H. Hahn, Lemay, and John F. Quinn and Marrine A. Terpstra, Kirkwood, Mo., assignors to Monsanto Chemical Company, St. Louis, Mo., a corporation of Delaware No Drawing. Application February 11, 1953, Serial No. 336,445

10 Claims. (Cl. 260—613)

This invention relates to the preparation of aralkyl halides and more specifically pertains to the preparation of aromatic substituted methyl halides.

Aralkyl halides are useful intermediates in the synthesis of such complex organic compounds as dyes and pharmaceuticals. For example, the dialkoxy especially dimethoxy and diethoxybenzyl halides are employed in the synthesis of papaverine and analogues of papaverine which are useful as antispasmodics.

Numerous methods have been proposed for the preparation of aralkyl and nuclear substituted benzyl halides. In general, these processes are carried out in an anhydrous reaction medium. One method heretofore proposed involves the reaction of thionyl chloride with the corresponding alcohol. For example, 3,4-dimethoxybenzyl alcohol (veratryl alcohol) is reacted with thionyl chloride in the presence of calcium chloride. Another method proposed involves reacting an anhydrous hydrohalide with the corresponding alcohol. For example, anhydrous hydrogen chloride is passed through a benzene or ether solution of veratryl alcohol to produce veratryl chloride. Also it has been proposed to chloromethylate the corresponding aromatic or nuclear substituted aromatic compound. For example, benzyl chloride can be prepared by the chloromethylation of benzene in the presence of zinc chloride. Veratryl chloride can be produced by the chloromethylation of veratrole at about 0° C. with aqueous formaldehyde and dry hydrogen chloride.

It has now been discovered that aromatic substituted methyl halides and especially alkoxybenzyl chlorides can be prepared by reacting the corresponding alcohol with a concentrated aqueous solution of the hydrohalide. This is most conveniently accomplished by carrying out the reaction in the presence of an inert reaction diluent. The process can be carried out at any desired temperature, however, best results will be obtained at temperatures below 25° C. Yields of over 90% can be obtained when the process is carried out at from −10° C. to 10° C.

More specifically the aromatic substituted methyl chlorides are prepared by slowly adding the corresponding alcohol to concentrated aqueous hydrochloric acid (33% to 37% HCl or higher) in admixture with the inert liquid diluent. Where the alcohol is a liquid at room temperature, it can be added to the reactor. However, where the alcohol is a solid, it is desirable to dissolve it in a portion of the reaction diluent and add the solution to the mixture containing the aqueous hydrochloric acid. The liquid alcohol reactants can be added in the same manner. For ease in handling and for further processing it is preferred to employ as a diluent a liquid in which both the alcohol and chloride are soluble. The quantity of diluent employed is not critical, however, a sufficient quantity of diluent should be employed to dissolve all of the chloride product. The quantity of aqueous hydrohalide employed of course depends upon the quantity of aralkyl alcohol charged and the concentration of the hydrohalide employed.

As hereinbefore stated, the aromatic substituted methyl halides are employed as intermediates in the synthesis of other organic chemical compounds and because of this utility are preferably employed as chlorides. In addition, hydrochloric acid is the lowest in cost of the hydrohalic acids. Furthermore, hydrochloric acid has the least tendency to produce undesirable side reactions. It is for these reasons that this invention will be described in detail with the use of hydrochloric acid as a reactant. It will be understood that hydrobromic and hydroiodic acids can also be employed to prepare the corresponding bromides and iodides.

According to the process of this invention, the aromatic substituted methyl halides are prepared in the presence of an inert reaction diluent. Preferably the reaction diluent is a solvent for both the alcohol reactant and the halide product and is insoluble in water. Thus the reaction can be carried out in the presence of ethers such as diethyl ether and petroleum ether, carbon tetrachloride, chloroform and other reaction diluents commonly employed in the laboratory. There can also be employed as the reaction diluent a liquid hydrocarbon such as the saturated aliphatic hydrocarbons from $C_5$ to $C_{15}$ and the liquid aromatic hydrocarbons as well as chlorinated derivatives of such hydrocarbons. More specifically there can be employed as the reaction diluent such liquid hydrocarbons as heptane or a mixture of aliphatic hydrocarbons such as gasoline or kerosene, aromatic hydrocarbons such as benzene, toluene, xylene, trimethylbenzene, ethylbenzene, the ethyltoluenes, propylbenzene, tetramethylbenzenes and the like, as well as mixtures of aromatic hydrocarbons. The liquid chlorinated derivatives of aliphatic and aromatic hydrocarbons which can be employed as reaction diluents are, for example, mono- and dichlorobutanes, mono- and dichloropentanes, mono- and dichloroheptanes, monochlorobenzene, monochlorotoluenes and the like. In the selection of the liquid diluent consideration should be given to the use to which the aralkyl halide is to be put. For example, if the subsequent reaction is carried out at elevated temperatures, a high boiling liquid diluent will be desirable. If the subsequent reaction is carried out at low temperatures, room temperature or below, a low boiling liquid can be used as a reaction diluent. Also the liquid diluent should be non-reactive in the subsequent reaction system.

The preferred alcohols which can be employed as reactants according to this invention possess the formula

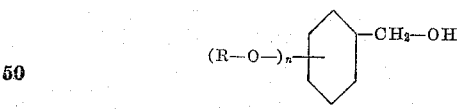

wherein R is an alkyl group containing one to five carbon atoms, and $n$ is a number from 1 to 3 inclusive. Thus included in the preferred alcohol reactants are the mono-, di- and trialkoxybenzyl alcohols. R in the above formula can be methyl, ethyl, n-propyl, isopropyl, n-butyl, sec.-butyl, tert.-butyl, amyl, tert.-amyl, isoamyl and the like. R as well as the ring can also contain such substituted groups as halogen, nitro, hydroxy, alkoxy, aryl, alkyl, aroxy, etc. Specific members of this preferred class of alcohols include among others 4-ethoxybenzyl alcohol, 2-butoxybenzyl alcohol, 2,3-dimethoxybenzyl alcohol (o-veratryl alcohol), 3,4-dimethoxybenzyl alcohol (veratryl alcohol), 3,4,5-trimethoxybenzyl alcohol, 2,4,5-trimethoxybenzyl alcohol, 3-methoxybenzyl alcohol, 4-methoxybenzyl alcohol, 2,3-diethoxybenzyl alcohol, 4-ethoxy-3,5-dimethoxybenzyl alcohol, 3-methoxy-4-ethoxybenzyl alcohol, 3,4-diethoxybenzyl alcohol, 3,4-dipropoxybenzyl alcohol, 3,4-dibutoxybenzyl alcohol, 3,4-diisopropoxybenzyl alcohol, 2-propoxybenzyl alcohol, 2-isoamoxybenzyl alcohol, 3-propoxy-4-methoxybenzyl alcohol, 3-ethoxy-4-isopropoxybenzyl alcohol, 3-propoxy-4-ethoxybenzyl alcohol, 3-isopropoxy-4-methoxybenzyl alcohol, 2-ethoxy-3-methoxy-5-nitro-benzyl alcohol, 4-ethoxy-2 (and 3) nitro-benzyl alcohol, 2,5-dimethoxy-3-methylbenzyl alcohol, 2,5-dimethoxy-3,4,6-trimethyl-benzyl alcohol, 3,6-dimethoxy-2,4,5-trimethyl-benzyl alcohol, 4-hydroxy-3,5-dimethoxybenzyl alcohol, 2-hydroxy-3-methoxybenzyl alcohol(o-vanillyl alcohol), 3-hydroxy-4-methoxybenzyl alcohol(isovanillyl alcohol), 4-hydroxy-3-methoxybenzyl alcohol(vanillyl alcohol), 2,3-diethoxy-5-nitrobenzyl alcohol, 2-methoxy-5-propylbenzyl alcohol, and 2-isopropoxy-5-methylbenzyl alcohol.

It has also been discovered that the presence of iron in the reaction medium influences the efficiency of the hydrohalogenation of the aralkyl alcohol. Where the concentration of iron in the reaction medium was 50 p. p. m. or greater, the yield of the desired halide was below 65%. Where the iron concentration was above about 25 p. p. m. and up to 50 p. p. m., the yield of desired halide was in the range of 65% to 80% with the yields increasing with a decrease in iron content. Thus, yields of the desired halide above 80% and up to 95% and above can be obtained from reaction systems wherein the iron concentration is 15 p. p. m. or less. It will, of course, be understood that the iron is present in the reaction medium as the chloride and mainly ferric chloride. Thus, for best results the hydrohalogenation process of this invention should be carried out in a system having an iron content of less than 25 p. p. m. and preferably at an iron content of 1 p. p. m. or less.

The iron content of the reaction medium can be readily reduced to the preferred range by employing an aqueous hydrochloric acid of low iron content and by removing the iron from the inert reaction diluent and the alcohol reactant. The iron can be easily removed from the diluent solvent and reactant alcohol by adding a small amount of dilute hydrochloric acid to the diluent or reactant and then washing them with water. After separating the water and diluent or reactant alcohol they are tested for iron content. If the iron content is still above the desired range, a second washing with hydrochloric acid and water will generally reduce the iron content to within the preferred range. A more detailed description of the removal of iron will appear in the examples.

The following specific examples are illustrative of the process of this invention and are not intended as a limitation thereon. The term "parts" is employed in these examples to indicate parts by weight.

*Example I*

To a reactor fitted with a stirrer and a means for cooling the reaction medium there was added 150 parts of monochlorobenzene having an iron content of less than 1.0 p. p. m. and C. P. concentrated hydrochloric acid containing 33 parts of HCl. This mixture was stirred and cooled to about 1° C. There was added with stirring over a period of two hours 170 grams of a solution containing 68.3 parts of 3-methoxy-4-ethoxybenzyl alcohol in 102 parts of monochlorobenzene. The iron content of this solution was also less than 1.0 p. p. m. The reaction mixture was stirred and maintained at 2° C. during the entire addition of the solution of alcohol. The reaction mixture was held at 2° C. and stirred for about five minutes after all the solution of alcohol had been added and then 75 parts of ice water were added. This mixture was agitated for about 10 minutes and the mixture allowed to settle. The oil layer was separated from the water layer and a washed sample of the oil layer assayed for bound chloride by potentiometric titration with 0.1 N silver nitrate to 125 to 130 mv. In this manner a yield of 96% of theory of 3-methoxy-4-ethoxy-benzyl chloride was obtained.

*Example II*

The process of Example I was repeated except that sufficient rust was added to the mixture containing monochlorobenzene and concentrated hydrochloric acid to provide a reaction mixture containing 7 p. p. m. of iron. The reaction temperature was 1.5° to 2° C. The yield of 3-methoxy-4-ethoxy-benzyl chloride was 93% of theory.

*Example III*

The process of Example I was repeated except that sufficient rust was added to the mixture containing monochlorobenzene and concentrated hydrochloric acid to provide a reaction mixture containing 10 p. p. m. of iron. The reaction was carried out at 2° C. The yield of 3-methoxy-4-ethoxy-benzyl chloride was 90% of theory.

*Example IV*

The process of Example I was repeated except that sufficient rust was added to the mixture containing monochlorobenzene and concentrated hydrochloric acid to provide a reaction mixture containing 15 p. p. m. of iron. The reaction was carried out at 2° to 3° C. The yield of 3-methoxy-4-ethoxy-benzyl chloride was 87% of theory.

As indicated in the examples above, the yield of dialkoxy benzyl chloride decreases as the iron content of the reaction medium increases. As hereinbefore stated the process of this invention is operative when iron concentration is above 15 p. p. m. for yields of 65% to 80% can be expected where the iron concentration is 15 to 25 p. p. m. However, the yield of the desired product drops too low and would not be considered satisfactory when the iron content of the reaction system is above 25 p. p. m.

*Example V*

To a reactor as described in Example I there was added 125 parts of monochlorobenzene having an iron content of less than 1 p. p. m. and 67 parts of C. P. concentrated hydrochloric acid (37% HCl). After the resulting mixture was cooled to 0° C., there was added dropwise over a period of about two hours with stirring 49 parts of 3,4-diethoxybenzyl alcohol dissolved in 100 parts of monochlorobenzene. The iron content of this solution was also less than 1.0 p. p. m. While the reaction medium was maintained at a temperature of 0° C., it was stirred for about five minutes after the solution of alcohol had been added and then 55 parts of ice water was added as a quench. This mixture was stirred for five minutes, allowed to settle for 15 minutes and the organic layer separated from the water layer. The organic layer was sampled and a washed sample assayed for bound chloride by potentiometric titration. In this manner it was determined that a yield of 96% of theory of 3,4-diethoxybenzyl chloride was obtained.

*Example VI*

The process of Example V was repeated except that the alcohol was dissolved in 100 parts of toluene containing less than 1.0 p. p. m. iron and this solution was dripped into a stirred mixture containing 80 parts of toluene containing less than 1 p. p. m. of iron and 67 parts of C. P. concentrated hydrochloric acid. The assay of the recovered organic layer for bound chloride indicated that a yield of 95% of theory of 3,4-diethoxybenzyl chloride was obtained.

*Example VII*

A solution containing 49 parts of 3,4-dimethoxybenzyl alcohol and 125 parts of monochlorobenzene containing less than 1.0 p. p. m. of iron was added dropwise to a stirred mixture containing 67 parts of C. P. concentrated hydrochloric acid and 100 parts of iron free monochlorobenzene at 0° C. over a period of two hours. When all the solution of alcohol had been added, the reaction mixture was quenched with 55 parts of ice water, stirred for about five minutes and then allowed to settle. The organic layer was separated from the water layer and assayed for bound chloride by potentiometric titration. In this manner it was determined that a yield of 96% of theory of 3,4-dimethoxybenzyl chloride was obtained.

*Example VIII*

To a stirred mixture containing 75 parts of 22° Bé. hydrochloric acid and 125 parts of iron free toluene at −5° C. there was added dropwise 50 parts of 3,4-dimethoxybenzyl alcohol over a two hour period. The resulting mixture was quenched with 55 parts of ice water, stirred for 5 minutes and allowed to settle for about 15 minutes. The organic layer was separated from the water layer and assayed for bound chloride by potentiometric titration. In this manner it was determined that a yield of 97% of theory of 3,4-dimethoxybenzyl chloride was obtained.

The following example illustrates a means whereby the iron content of the reaction diluent and alcohol is reduced to within the preferred limits by a method which is readily adaptable for industrial practice and also illustrates a large scale preparation of an alkoxybenzyl chloride.

*Example IX*

There is charged to a wash tank 125 pounds of monochlorobenzene, 27.5 pounds of water and 1.4 pound of C. P. concentrated hydrochloric acid all at room temperature. The resulting mixture is stirred for 15 minutes and allowed to settle. The bottom oil layer is sampled and tested for iron. If the iron content is 1.0 p. p. m. or less, the oil layer is withdrawn and charged through a cloth filter for the hydrochlorination and cooled with stirring to about 0° C. If the iron content is too high the two layers are separated and the monochlorobenzene is washed a second time. Generally, washing twice with hydrochloric acid and water will reduce the iron content to less than 1.0 p. p. m.

Then there is dissolved in 191 pounds of monochlorobenzene 125 pounds of molten (61° C.) 3-methoxy-4-ethoxy-benzyl alcohol. This solution is stirred, cooled to 25° to 30° C. and 32 pounds of tap water and 1.6 pounds of C. P. concentrated hydrochloric acid are added. The resulting mixture is stirred for about 10 minutes and allowed to settle. The bottom oil layer is sampled and analyzed for iron. The bottom oil layer is withdrawn and the water layer discarded. When the iron content of the solution is reduced to 1.0 p. p. m. or less the solution is ready for use.

To the substantially iron free cooled monochlorobenzene in the hydrochlorinator there is added 187 pounds of 22° Bé. food grade hydrochloric acid and the resulting mixture cooled with stirring to about 2° C. Then the solution of the mixed alkoxybenzyl alcohol is charged slowly over a period of about 90 minutes to the hydrochlorinator while the reaction medium is stirred. Since a small amount of heat is liberated by the reaction, the reaction mixture should be cooled to maintain a reaction temperature within the range of 2° to 5° C. After all the solution of alcohol has been added, the reaction mixture is stirred for about five minutes and then quenched with 137 pounds of ice water. The quenched mixture is stirred for five minutes and then allowed to settle to form a top water layer and a bottom organic layer or oil layer. The bottom layer is withdrawn and charged to a hold tank for further use as an intermediate. The water layer is discarded.

A sample of the oil layer recovered is assayed for bound chloride by potentiometric titration with 0.1 N AgNO$_3$ to 125–130 m. with an electrode system Ag: Soln 0.5M K$_2$SO$_4$ : HgSO$_4$ : Hg.

From such an assay it was determined that the oil layer obtained above contained 136.5 pounds of 3-methoxy-4-ethoxy-benzyl chloride which, based on the alkoxybenzyl alcohol charged, represents a yield of 99%.

The process of this invention as illustrated by the foregoing specific examples can be employed in the preparation of benzyl and substituted benzyl halides in addition to the preferred class of benzyl alcohols hereinbefore set forth. For example, there can be employed as the alcohol reactant 4-methylbenzyl alcohol, diphenylmethyl alcohol (a-phenyl benzyl alcohol), o-(m- and p-)-methyl-diphenyl-methyl alcohol, o- and m-ditolylmethyl alcohol, o- and p-chlorodiphenylmethyl alcohol, o-benzylbenzyl alcohol, o- and p-ethylbenzyl alcohol, p-isopropylbenzyl alcohol (cumic alcohol), 2,3-dimethylbenzyl alcohol, 2,5-dimethylbenzyl alcohol, 3,5-dimethylbenzyl alcohol (mesityl alcohol), tolyl alcohol, 2,4,5,6-tetramethylbenzyl alcohol, 2,3,4,6-tetramethylbenzyl alcohol, 2,4,6-triisopropylbenzyl alcohol, 2,3,6-trimethylbenzyl alcohol, 2,4,6-trimethylbenzyl alcohol, 4-cyclohexylbenzyl alcohol, m- and p-phenoxybenzyl alcohol, 4-methoxymethylbenzyl alcohol, 3 (and 4)-ethoxymethylbenzyl alcohol, 3 (and 4)-phenoxymethylbenzyl alcohol, 3-(gamma-ethoxypropyl)-benzyl alcohol, 4-isopropylbenzyl alcohol (cumyl alcohol), 2-phenylbenzyl alcohol, 2-methyl-5-nitrobenzyl alcohol, 4-hydroxy-3-methylbenzyl alcohol, 2 - hydroxy - 5 - methylbenzyl alcohol (homosaligenin), 4-hydroxy-3,5-dimethylbenzyl alcohol, diisopropylbenzyl alcohol, 2,5-dihydroxybenzyl alcohol (gentisyl alcohol), 3,4-dihydroxybenzyl alcohol (protocatechuyl alcohol) and the like.

This invention has been illustrated in detail by the use of specific reactants as well as by employing specific quantities of reactants, it is not, thereby, desired or intended to limit the invention solely thereto, for as hitherto stated the reactants and the reaction conditions may be varied and the proportions of the reactants can be varied as desired or required.

What is claimed is:

1. In the preparation of a dialkoxybenzyl halide by the hydrohalogenation of a dialkoxybenzyl alcohol, the step comprising slowly adding a dialkoxybenzyl alcohol whose alkoxy groups contain 1 to 5 carbon atoms to a concentrated aqueous solution of a member selected from the group consisting of hydrogen bromide, hydrogen chloride and hydrogen iodide, at a temperature below 25° C. in the presence of an inert water-immiscible liquid reaction diluent.

2. In the process for the preparation of a dialkoxybenzyl chloride by the hydrochlorination of a dialkoxybenzyl alcohol, the step comprising slowly adding a dialkoxybenzyl alcohol whose alkoxy groups contain 1 to 5 carbon atoms to concentrated hydrochloric acid at a temperature below 25° C. in the presence of an inert water-immiscible liquid reaction diluent.

3. In the process for the preparation of a dialkoxybenzyl chloride by the hydrochlorination of a dialkoxybenzyl alcohol, the step comprising slowly adding a dialkoxybenzyl alcohol whose alkoxy groups contain 1 to 5 carbon atoms to hydrochloric acid containing 33% to 37% by weight of HCl at a temperature below 10° C. in the presence of an inert water-immiscible liquid reaction diluent.

4. In the process for the preparation of a dialkoxybenzyl chloride by the hydrochlorination of a dialkoxybenzyl alcohol whose alkoxy groups contain 1 to 5 carbon atoms, the step comprising slowly adding said dialkoxybenzyl alcohol to a mixture comprising an inert water-immiscible solvent for the dialkoxybenzyl chloride and hydrochloric acid containing from 33% to 37% by weight of HCl at a temperature below 10° C., wherein the concentration of iron is below 25 p. p. m.

5. In the process for the preparation of a dialkoxybenzyl chloride by the hydrochlorination of a dialkoxybenzyl alcohol whose alkoxy groups contain 1 to 5 carbon atoms, the step comprising slowly adding said dialkoxybenzyl alcohol to a mixture comprising an inert water-immiscible solvent for the dialkoxybenzyl chloride and hydrochloric acid containing from 33% to 37% by weight of HCl at a temperature below 10° C. where the iron content as based on the total reaction mixture is less than 10 p. p. m.

6. The process of claim 5 wherein the inert liquid diluent is toluene.

7. In the process for the preparation of a dialkoxybenzyl chloride by the hydrochlorination of a dialkoxybenzyl alcohol whose alkoxy groups contain 1 to 5 carbon atoms, the step comprising slowly adding said dialkoxybenzyl alcohol to a mixture comprising monochlorobenzene and hydrochloric acid containing from 33% to 37% by weight of HCl at a temperature of from 0° to 5° C. where the reaction mixture is substantially free from iron.

8. The process of claim 7 wherein the dialkoxybenzyl alcohol is 3,4-dimethoxybenzyl alcohol.

9. The process of claim 7 wherein the dialkoxybenzyl alcohol is 3,4-diethoxybenzyl alcohol.

10. The process of claim 7 wherein the dialkoxybenzyl alcohol is 3-methoxy-4-ethoxy-benzyl alcohol.

References Cited in the file of this patent
UNITED STATES PATENTS

| | | |
|---|---|---|
| 1,872,227 | Bennett et al. | Aug. 16, 1932 |
| 2,542,216 | Somogyi | Feb. 20, 1951 |

OTHER REFERENCES

Norris: American Chemical Jour., vol. 38, pp. 638–639 (1907).

J. Huntress: "Organic Chlorine Compounds" (1948), John Wiley & Sons, New York, N. Y., p. 1161.